US008881356B2

(12) United States Patent
Geenen et al.

(10) Patent No.: US 8,881,356 B2

(45) Date of Patent: Nov. 11, 2014

(54) METHOD FOR MANUFACTURING A SITTING ORTHOSIS FROM A REPRESENTATION OF THE CONTACT SURFACE OF THE SITTING ORTHOSIS, AND A SITTING ORTHOSIS MANUFACTURED IN SUCH A MANNER

(75) Inventors: Kamiel Reinier Zale Geenen, Nijmegen (NL); Bernard Jan Kamp, Oldenzaal (NL); Simon Alexander Verheul, Nijmegen (NL); Jeroen Gerard Theodor Jans, Nijmegen (NL)

(73) Assignee: Perteon Seats B.V., Oldenzaal (NL)

( * ) Notice: Subject to any disclaimer, the term of this patent is extended or adjusted under 35 U.S.C. 154(b) by 291 days.

(21) Appl. No.: 13/375,001

(22) PCT Filed: May 27, 2010

(86) PCT No.: PCT/NL2010/050317

§ 371 (c)(1),
(2), (4) Date: Feb. 8, 2012

(87) PCT Pub. No.: WO2010/137978

PCT Pub. Date: Dec. 2, 2010

(65) Prior Publication Data

US 2012/0124811 A1 May 24, 2012

(30) Foreign Application Priority Data

May 29, 2009 (NL) ...................................... 2002945

(51) Int. Cl.

| | |
|---|---|
| ***A47C 7/02*** | (2006.01) |
| ***G06F 19/00*** | (2011.01) |
| ***B68G 7/00*** | (2006.01) |
| *A61G 5/10* | (2006.01) |

(52) U.S. Cl.

CPC ...... *A61G 5/1043* (2013.01); *A61G 2005/1091* (2013.01)

USPC ............. 29/91.1; 29/91; 29/428; 297/452.24; 297/452.28; 297/452.33; 297/452.36; 700/95; 700/98; 700/117; 700/118; 700/159

(58) Field of Classification Search

USPC ......... 29/91, 91.1, 428; 700/98, 95, 117, 118, 700/159; 297/217.2, 452.28, 452.33, 297/452.36, 452.24

See application file for complete search history.

(56) References Cited

U.S. PATENT DOCUMENTS 4,484,782 A * 11/1984 Larson ..................... 297/452.28
4,890,235 A * 12/1989 Reger et al. ................... 700/118

(Continued)

FOREIGN PATENT DOCUMENTS

| | | | |
|---|---|---|---|
| EP | 2116153 | A1 | 11/2009 |
| NL | 1031076 | | 8/2007 |
| WO | 9111142 | A1 | 8/1991 |

*Primary Examiner* — Essama Omgba
*Assistant Examiner* — Darrell C Ford
(74) *Attorney, Agent, or Firm* — The Webb Law Firm, P.C.

(57) ABSTRACT

The invention relates to a method for manufacturing a sitting orthosis, which is provided with a contact surface where the user of the sitting orthosis makes contact with the sitting orthosis, from a representation of the contact surface of the sitting orthosis. The method comprises of manufacturing a shell part on the basis of the representation of the contact surface by machining processable material under the control of the representation of the contact surface of the sitting orthosis; and arranging a covering layer on the thus obtained shell part. The invention also relates to a sitting orthosis. The sitting orthosis comprises a contact surface where the user of the sitting orthosis makes contact with the sitting orthosis, wherein the sitting orthosis is assembled from a shell part of a material processable by machining and wherein at least the contact surface is provided with a covering layer.

12 Claims, 7 Drawing Sheets

(56) References Cited

U.S. PATENT DOCUMENTS

| | | | | |
|---|---|---|---|---|
| 4,963,212 | A * | 10/1990 | Rasmussen | 156/222 |
| 4,972,351 | A * | 11/1990 | Reger et al. | 700/118 |
| 5,887,951 | A * | 3/1999 | Willingham | 297/452.23 |
| 5,930,152 | A * | 7/1999 | Dumont et al. | 700/302 |
| 6,033,025 | A * | 3/2000 | Christofferson et al. | 297/452.36 |
| 8,177,302 | B2 * | 5/2012 | Carlson et al. | 297/452.64 |
| 8,733,843 | B2 * | 5/2014 | Franz et al. | 297/452.28 |
| 2009/0306714 | A1 * | 12/2009 | Crompton | 606/242 |
| 2010/0268138 | A1 * | 10/2010 | Summit et al. | 602/16 |
| 2013/0080286 | A1 * | 3/2013 | Rotholz | 705/26.5 |

* cited by examiner

METHOD FOR MANUFACTURING A SITTING ORTHOSIS FROM A REPRESENTATION OF THE CONTACT SURFACE OF THE SITTING ORTHOSIS, AND A SITTING ORTHOSIS MANUFACTURED IN SUCH A MANNER

BACKGROUND OF THE INVENTION

1) Field of the Invention

The invention relates to a method for manufacturing a sitting orthosis, which is provided with a contact surface where the user of the sitting orthosis makes contact with the sitting orthosis, from a representation of the contact surface of the sitting orthosis, and to a sitting orthosis manufactured in such a manner.

2) Discussion of the Prior Art

A sitting orthosis is a chair for supporting a person with an anomalous anatomy in a comfortable position. A known anatomical abnormality for which a sitting orthosis is applied is a curvature of the spine, also referred to as scoliosis or kyphosis. The contact or support surface with which such a sitting orthosis supports the person positioned therein is usually made to measure for the person, whereby a contact surface is obtained between the person and the orthosis with a pressure distribution which is as homogeneous as possible. Not only can the person hereby be accommodated in the sitting orthosis with a good sitting comfort, the body parts of the person also enjoy a good support, this preventing a deterioration in the anatomical abnormality in the longer term.

The present invention is based on the availability of the coordinates of a contact surface for an orthosis, either in digital form or in a physical form, for instance in the form of an impression. For the acquiring of such an impression reference is made to Netherlands Patent Application No. NL-C-2002944, and corresponding U.S. patent application Ser. No. 13/322,987, filed concurrently with the present patent application.

According to the prior art an orthosis is manufactured by making an impression of a negative form of the contact surface. A physical form of the impression, from which a contact surface can be obtained, must thus be present for this purpose. Such a method for obtaining a contact surface for a sitting orthosis has a limited accuracy, which may be to the detriment of the comfort of the user and may in the longer term cause a deterioration in the anatomical abnormality. The contact surface is then usually provided with a relatively thick cushion layer. The above stated drawback is hereby only partially obviated, since such a cushion layer provides insufficient support.

The object of the invention is to provide such a method, wherein at least one of the above stated drawbacks is obviated.

SUMMARY OF THE INVENTION

This object is achieved with such a method, in which a shell part of the orthosis is manufactured on the basis of the representation of the contact surface by machining processable material under the control of the representation of the contact surface of the sitting orthosis, and by arranging a covering layer on the thus obtained shell part.

The manufacture of a shell part by a machining process makes it possible in principle to manufacture a shell part with a high precision, wherein the precision is limited solely by the resolution of the representation and the precision of the tool used. Using machining techniques it is also possible to manufacture forms which are not self-releasing. This method also provides the option of taking into account the thickness of the covering material. A thinner covering layer can also suffice. A more effective method is hereby provided than according to the prior art. Effective is understood here to mean inter alia that the method is quick, efficient and accurate.

The invention also provides a sitting orthosis comprising a contact surface where the user of the sitting orthosis makes contact with the sitting orthosis, wherein the sitting orthosis is assembled from a shell part of a material processable by machining and wherein at least the contact surface is provided with a covering layer.

The method can be embodied easiest when the contact surface of the sitting orthosis is represented by a digital file and this digital file is used to control the machining process. The digital file can after all be used directly to control the machine performing the machining process. The digital file is usually formed by a series of coordinates. Such a form of the file must be converted to a form which forms a continuous representation of the contact surface, for instance through interpolation. This is because such a representation is necessary in order to control the machining device. A digital file also provides the option of making corrections in simple manner, for instance in order to compensate for the thickness of layers to be subsequently arranged on the shell part or in order to make recessed parts where a reduced contact pressure between the user and the contact surface is desired.

The shell part to be manufactured by the method comprises not only a contact surface but also other surfaces. It must also be possible to mount the shell part on a frame, and secondary support means must be mounted thereon, for which purpose mounting means are necessary. Data of these surfaces will also have to be available during the manufacture of the shell part. For this purpose a further preferred embodiment provides the measure that the digital file is extended with surfaces adjacent to the contact surface and with indicators for inserts for mounting the shell part on a supporting frame, and that use is made of the thus modified file in the machining manufacture of the shell part.

In a preferred embodiment the representation of the contact surface is desirably recessed locally and use is made of the thus modified representation of the contact surface in the machining manufacture of the shell part. By making use of the representation of the contact surface which is desirably recessed locally a shell part is obtained with correspondingly deeper-lying areas. Such deeper-lying areas of the shell part exert a reduced pressure on the person, which enhances comfort and prevents a deterioration in the anatomical abnormality in the longer term. Such areas are located particularly, but not exclusively, where the harder anatomical parts, such as bones, of the person situated in a desired position in the sitting orthosis touch the contact surface.

The shell part can be manufactured from various materials, such as wood or metal. The shell part is preferably manufactured from a substantially light material such as expanded polystyrene. Not only does polystyrene have a light weight, it is also inexpensive and easy to process. This material is intrinsically not very strong, in any case not strong enough to serve as supporting element for a sitting orthosis. A further preferred embodiment therefore provides the measure that the shell part is covered with a layer of stiff material after the machining processing thereof, and that prior to the machining processing of the shell part the representation of at least the contact surface is modified for the thickness of the layer of stiff material. By arranging a stiff layer the stiffness and strength of the shell part will increase so that it can be used as seat. This embodiment also provides for the modification of the representation of the contact surface; the additional arranged layer does after all have a certain thickness which must be taken into account in the machining processing of the shell part. The layer of stiff material is preferably applied by means of spraying, although that the use of immersion or application with a brush for the purpose of applying the stiff layer are not precluded.

The layer of stiff material preferably comprises polyurethane, and the layer of stiff material more preferably comprises polyurea. These materials combine a good strength and stiffness.

This embodiment also provides a sitting orthosis with a shell part which is covered with a layer of stiff material, thereby greatly increasing the comfort for the user.

The digital file is preferably provided with indicators for inserts of armrests, the space for the inserts is preferably recessed during manufacture of the shell part and the inserts are mounted on the shell part before the layer of stiff material is arranged. Not only is a base hereby obtained for the placing of the arms or hands of the user, but also for placing for instance a work surface on the armrests, the upper surface of which preferably coincides with that of the armrests.

The same embodiment provides a sitting orthosis provided with inserts for armrests, which inserts are covered with the layer of stiff material. The inserts particularly comprise fastening means, such as drive-in nuts connected rigidly to the inserts, for fastening the armrests to the inserts. The inserts can be manufactured from various materials, for instance from MDF (medium density fiberboard), wood or plastic. These materials combine a sufficient strength with a low weight and are also easy to process. The inserts are preferably manufactured substantially from MDF. Inserts of MDF allow a good further processing, such as the application of a coating, wherein no or hardly any bubbling occurs.

During performing of the machining process poorly accessible locations usually have to be processed by the machining tool, and this makes high demands of the device, such as a CNC device, on which the tool is mounted, such as in respect of the number of degrees of freedom of the device. These machine requirements are greatly reduced when the shell part is manufactured by individual machining of at least two pieces of material which are separated by means of at least one substantially vertically extending separating plane and which are joined together during assembly of the shell part. The machining processing of two or more pieces of material is after all considerably simpler because these pieces are more easily accessible by the tool. The use of multiple pieces also provides the advantage that the pieces can be clamped along their separating plane, since this does not have to be processed.

The covering layer has a certain thickness so that the covering layer, once arranged, distorts the shape of the contact surface. In order to avoid this, another preferred embodiment provides the measure that before the shell part is manufactured the representation of at least the contact surface is modified for the thickness of the covering layer.

The form of the contact surface is usually irregular, with double-curved and varying radii of curvature, so that it is only possible to obtain a properly fitting covering by assembling it from different, usually irregularly formed pieces and mutually connecting these pieces. According to the prior art this is done 'by sight' so that the form of the covering only corresponds to a limited extent to that of the shell part. In order to make a better-fitting covering a further embodiment provides the measure that the covering layer is assembled from cut-out flat parts of flexible material, the form of which is determined in digital manner from the digital representation of at least the contact surface.

In order to provide the user of the sitting orthosis with the best possible comfort the covering layer comprises a cushion layer and a top layer, wherein the two layers are assembled from cut-out flat parts of flexible material, the form of which is determined in digital manner from the digital representation of the contact surface. The cushion layer and top layer are here particularly connected to each other prior to cutting out of the flat parts, this simplifying the manufacture of the covering layer.

This embodiment also provides a sitting orthosis wherein the covering layer comprises a top layer and a cushion layer which extends only over the contact surface under the covering layer.

In order to obtain a covering element with the best possible fit and connection it is recommended that prior to being arranged on the shell part the cut-out parts of the covering layer are mutually connected by adhering the side surfaces of the cut-out parts, possibly combined with stitching.

Outside the contact surface the cushion layer has hardly any function, while the top layer does. It is therefore recommended that the cushion layer is arranged only on the contact surface and the top layer is also arranged on surfaces of the shell part adjacent to the contact surface. The cushion layer and/or the top layer can thus extend beyond an outer contour of the contact surface, wherein the part of the cushion layer and/or the top layer extending beyond the outer contour of the contact surface is connected to the shell part via fastening means. Although more material is required here, a good connection of the covering layer to the shell part is obtained, wherein the connecting means are situated at a position beyond the outer contour of the contact surface. The person present in the sitting orthosis hereby does not suffer any inconvenience from the fastening means. Suitable fastening means are hook and loop strip, a zip and particularly press-studs. A row of press-studs of the first type is here connected to the shell part and a row of press-studs of the second type, which can be connected releasably to the first row of press-studs, is connected to the covering layer. The covering layer is preferably provided here with a strengthening strip, to which the row of press-studs of the second type is connected. A sufficiently strong connection of the row of press-studs of the second type and the covering layer is hereby obtained. In the manufacture of the strengthening strip use can be made of the representation of the contact surface, and in particular of the outer contour of the contact surface. The strengthening strip is preferably manufactured from plastic, which combines a sufficient flexibility, toughness and strength.

As in the prior art, the mutual attachment of the cut-out flat parts of the top layer takes place by stitching, although other connections such as with adhesive are not precluded. The thus resulting stitched seams have a certain thickness which is greater than the thickness of the single top layer. When the user sits in the sitting orthosis, determined body parts, such as sitting bones, will exert a great pressure on the top layer. If seams are present precisely at these locations they will be perceived by the user as annoying and may result in decubitus or other complaints. In order to prevent this it is recommended that, prior to being arranged on the hard layer, the cut-out parts of the top layer are mutually connected by stitching of the cut sides, and that positions of the contact surface which are uncomfortable for the user are formed by pieces of material.

This prevents seams being situated at positions which are uncomfortable for the user, such as at the position of the sitting bones.

In order to enable easy cleaning of the covering, it is recommended that the top layer is arranged removably on the shell part. For the same reason it is otherwise also possible for the cushion layer to also be arranged removably on the shell part.

This measure results in a sitting orthosis wherein the covering layer comprises a top layer and a cushion layer extending only over the contact surface under the covering layer.

Users of sitting orthoses are usually people with a greatly limited mobility. They will nevertheless have to leave the sitting orthosis occasionally, and this requires a great deal of effort on the part of carers. Use is made of lifting devices in order to reduce this effort. For this purpose a lifting sheet provided with coupling means must be placed under the user of the orthosis, once again with a great deal of effort on the part of the carers and discomfort to the user, after which the user can be lifted to his/her desired position. In order to obviate these drawbacks a preferred embodiment proposes that the covering layer is provided with coupling means for coupling the covering layer to a lifting member adapted to lift the top layer with the user therein. The user can hereby be coupled more easily to the lifting means. After being used for lifting purposes, the covering layer can be arranged once again on the sitting orthosis. The coupling means preferably comprise a strap or a strip, manufactured for instance from textile, which strap or strip is situated on the side of the covering layer directed toward the contact surface, wherein the strap is preferably connected to the covering layer. The cushion layer and the top layer are particularly also connected to each other on the mutually facing sides, this connection preferably comprising an adhesive.

BRIEF DESCRIPTION OF THE DRAWINGS

The present invention will be further elucidated on the basis of the non-limitative exemplary embodiments shown in the following figures. Herein.

DETAILED DESCRIPTION OF THE PREFERRED EMBODIMENTS

Figure 1:
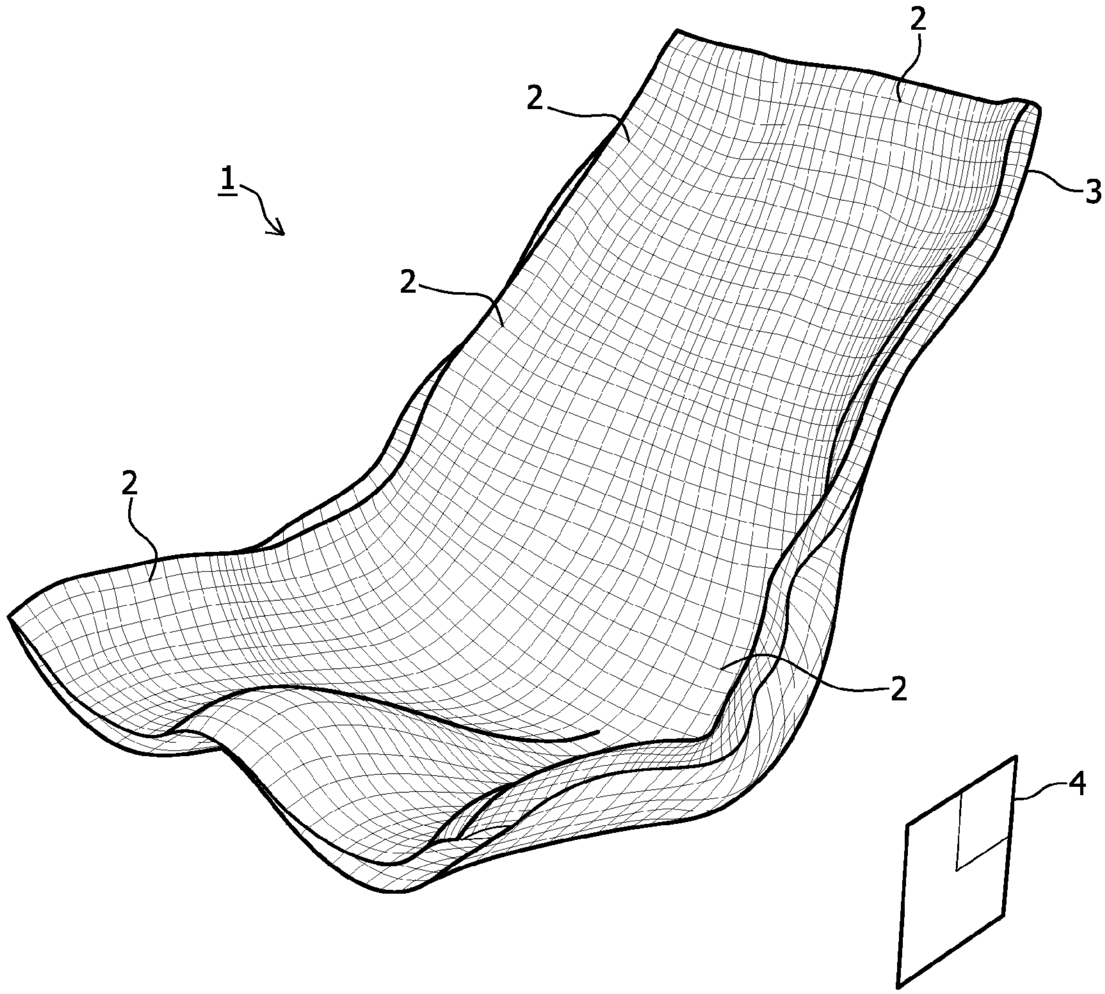
FIG. 1 shows a perspective view of a digitized model of a contact surface for a sitting orthosis according to the invention.
Figure 6:
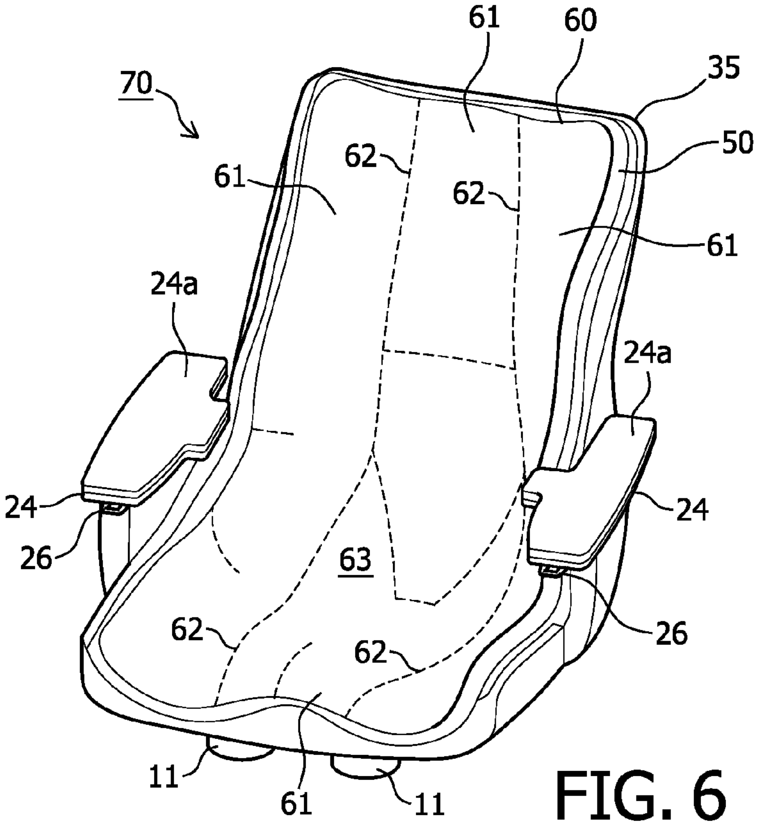
FIG. 6 shows a perspective front view of a sitting orthosis according to the invention.

FIG. 1 shows a perspective view of a digitized model of a contact surface 1 for a sitting orthosis according to the invention. Contact surface 1 is measured for the relevant patient. It is represented by a grid with nodes 2 (only a few nodes are indicated). For the acquiring of contact surface 1 reference is made to a patent application filed concurrently with the present patent application. Added initially to the model is a processing surface 3 which is placed inward at a pre-known distance from contact surface 1 in order to compensate for layers to be arranged on a shell part to be manufactured using the model, such as a layer of hard material arranged on the shell part and a covering layer, whereby a person-specific contact surface with the most homogenous possible pressure distribution is still obtained from processing surface 3, as is shown in FIG. 6. The model also comprises a reference surface 4 so that the model is provided with an orientation of contact surface 1 relative to a horizontal plane. The digital model of a processing surface 3 forms the basis for forming a shell part for the sitting orthosis according to the invention.

Figure 2A:
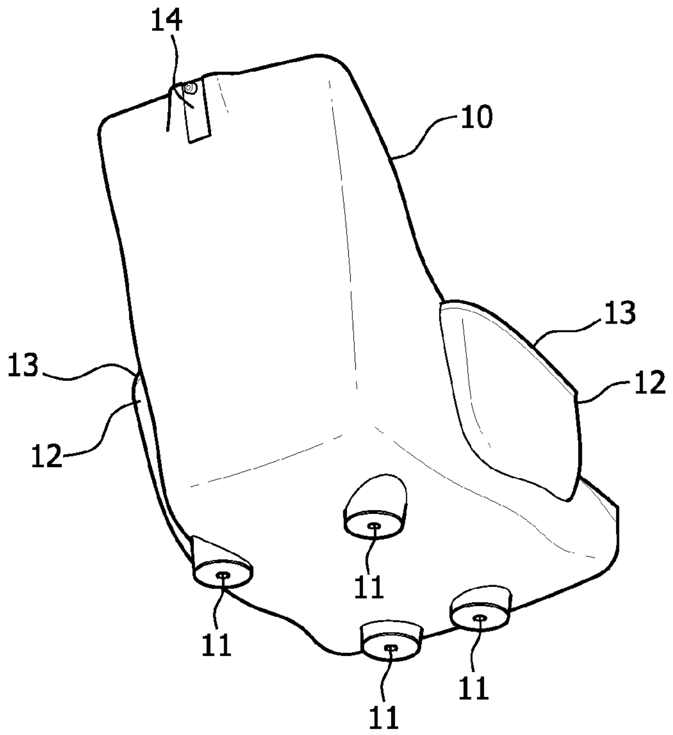
FIG. 2*a* shows a perspective rear view of a model of a shell part for a sitting orthosis according to the invention provided with mounting points for accessories.
Figure 2B:
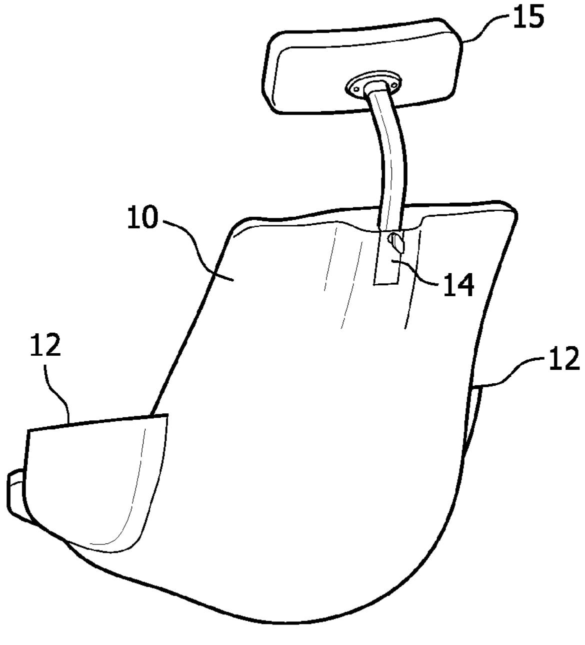
FIG. 2*b* shows a perspective rear view of a model of a shell part for a sitting orthosis according to the invention provided with a model for a headrest.

FIG. 2*a* shows a perspective rear view of a model of a shell part 10 for a sitting orthosis according to the invention. Shell part 10 is provided with mounting points 11 for mounting shell part 10 on a frame (not shown here) of for instance a wheelchair. The positions of mounting points 11 are adapted here to the mounting points of the frame. The model of a shell part 10 also comprises mounting points 12 for armrests 13 and an mounting element 14 for a headrest 15 as shown in FIG. 2*b*.

Figure 3:
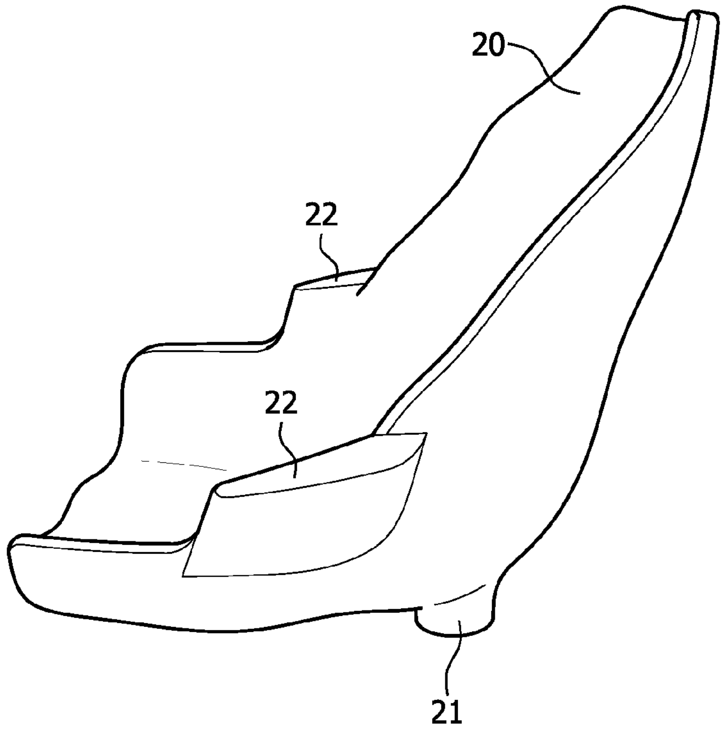
FIG. 3 shows a perspective view of a core of a shell part for a sitting orthosis according to the invention.

FIG. 3 shows a perspective view of a core 20 for a sitting orthosis according to the invention. The core is manufactured from a solid form of expanded polystyrene using a computer-controlled milling machine, whereby core 20 has a low weight and provides sufficient form retention. Core 20 comprises mounting points 21 for mounting the core 20 on a frame (not shown here) of for instance a wheelchair, of which only one mounting point 21 is shown here. Mounting points 21 are formed integrally with core 20. In the manufacture of the core use is made of a model which is compensated for the thickness of the cushion layer and top layer to be arranged later. The core is constructed from two or more parts, whereby manufacture by machining is considerably simplified. Particularly the clamping and the accessibility for machining tools are hereby improved. Surfaces 22 for armrests (not shown here) are also shown in this figure.

Figure 4A:
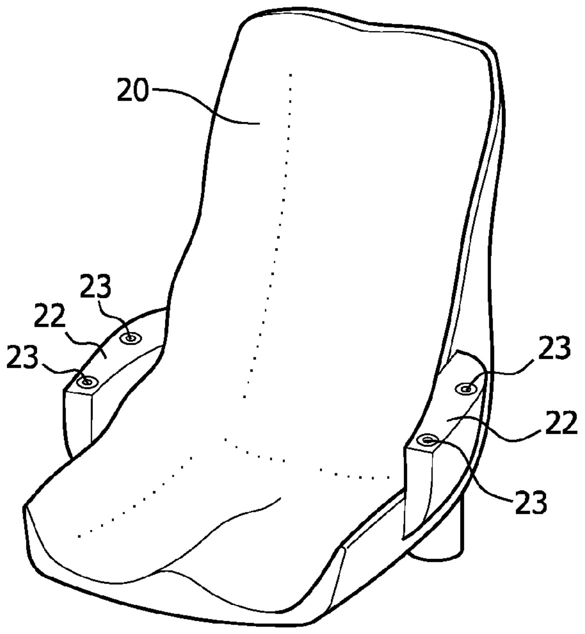
FIG. 4*a* shows a perspective view of the core of a shell part provided with inserts for armrests for a sitting orthosis according to the invention.

FIG. 4*a* shows a perspective view of core 20 of FIG. 3, wherein inserts 23 for armrests are placed on surfaces 22. Inserts (not shown here) are here also placed on mounting points 21 in order to mount shell part 10 on a frame (not shown here) of for instance a wheelchair. The inserts for mounting core 20 on the frame and the armrests to core 20 are manufactured from MDF in order to impart sufficient strength and also serve to distribute the forces exerted on the inserts by the user of the sitting orthosis in core 20.

Figure 4B:
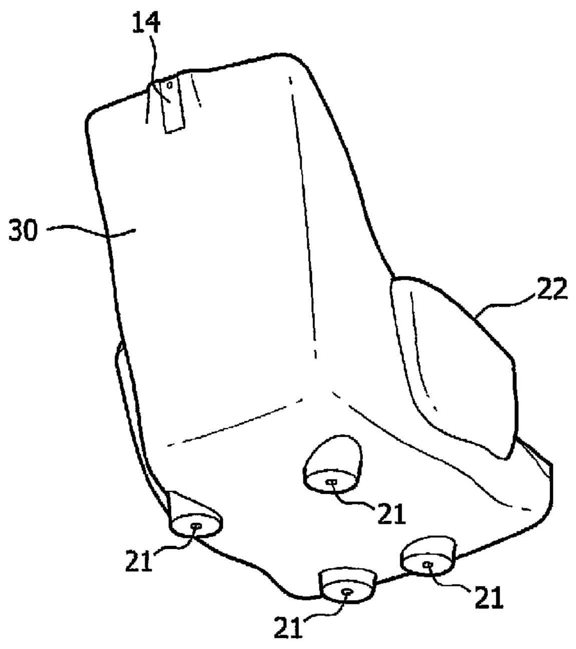
FIG. 4*b* shows a perspective view of the core of a shell part, wherein a plastic layer is arranged on the core.

FIG. 4*b* shows a perspective view of core 20 of FIG. 4*a*, wherein a layer 30 of hard material is arranged on core 20, including the various mounting points 21 and inserts 23. Hard layer 30 is manufactured from a hard plastic, such as polyurethane, which not only makes the plastic layer wear-resistant but which also provides core 20 with a high degree of stiffness. A sandwich panel is hereby as it were manufactured. A sandwich panel is usually constructed from a lightweight core with a 'skin' of a stiff and strong material. Because the skin is placed at a distance from the centre of the sandwich panel, a possible deformation of the skin under load is prevented by the stiffness of the core, whereby the skin will absorb the load. Polyurethane coating 30 is sprayed onto core 20 using a spraying device.

Figure 4C:
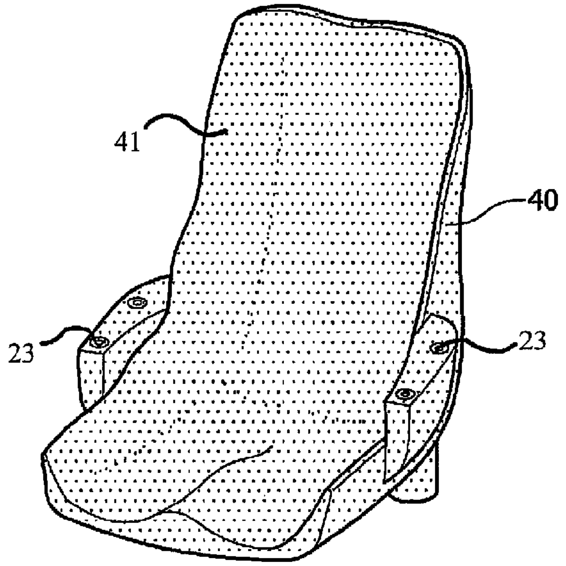
FIG. 4*c* shows a perspective view of the shell part for a sitting orthosis, wherein a colour coating is arranged on the plastic layer.

FIG. 4*c* shows a perspective view of a shell part 40 for a sitting orthosis, wherein a colour coating 41 is applied to the plastic layer. Colour coating 41 is sprayed onto core 20 over polyurethane coating 30 using a spraying device.

Figure 5:
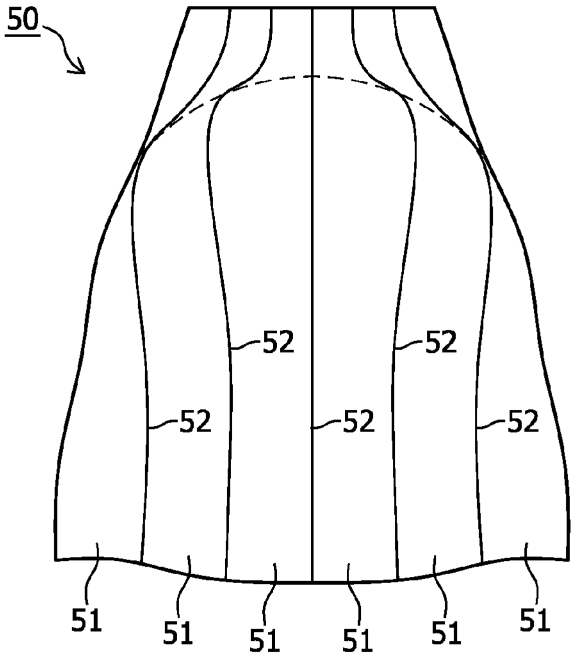
FIG. 5 shows a perspective rear view of a soft foam layer for a sitting orthosis according to the invention.

FIG. 5 shows a perspective rear view of a cushion layer 50 of soft foam such as polyether for a sitting orthosis according to the invention. Cushion layer 50 is constructed from strips of polyether 51. The form of the strips of polyether is determined on the basis of processing surface 3 as shown in FIG. 1. This processing surface 3 is read into a so-called soft foam protocol, whereby a model of strips 51 is determined such that the final strips 51 do not deform, or only minimally so, when they take on the shape of contact surface 1. Strips 51 are then adhered together in a desired orientation at edges 52 of strips 51. Although polyether allows adhesion using various types of adhesive, wherein most solvents do not affect the polyether, an adhesive on polychloroprene basis is highly suitable. A foam layer is in this way obtained with a form which fits closely onto processing surface 3.

A comparable process takes place during forming of a upholstery layer 60, which is shown in FIG. 6. Upholstery layer 60 is assembled from strips of fabric 61. The fabric can be manufactured integrally from a readily washable material, such as cotton, but in the present embodiment also comprises parts manufactured from plastic. These parts manufactured from plastic absorb less or no moisture, whereby fluid possibly lost by a user of the sitting orthosis can be easily removed. The shape of the strips of fabric 61 is determined by the side of the soft foam layer 50 remote from processing surface 3. This surface is read into a so-called upholstering protocol, with which a model of strips 61 is determined such that the final strips 61 take on the form of contact surface 1 in tension-free manner or with minimal bias. Strips 61 are then stitched together in a desired orientation at edges 62 of strips 61. This can be done using diverse known stitching techniques. A stitching technique can for instance be applied wherein the stitched seams are visible and tangible on either side of the strips. The 'blind stitching' technique known to the skilled person can also be applied, wherein stitches of the stitched seam do not extend completely through strips 61 and strips 61 are thus free of the stitched seam on one side, this improving the sitting comfort. On pre-known areas 63, such as those on which the sitting bones come to rest, upholstery layer 60 is left clear of a stitched seam in order to provide the user of the sitting orthosis with more comfort and to prevent complaints such as decubitus. This is particularly advantageous when the stitching techniques are applied wherein the stitched seam is tangible on both sides of strips 61. The thus obtained upholstery layer 60 forms the final contact surface 1 corresponding to the digitized model of the contact surface of FIG. 1.

FIG. 6 shows a perspective front view of a sitting orthosis 70 according to the invention. Sitting orthosis 70 here comprises the shell part 40 formed by core 20 and provided with plastic layer 30 and colour layer 41. Both cushion layer 50 and upholstery layer 60 are placed on shell part 40. The sitting orthosis is further provided with armrests 24 on which is placed a layer 24*a* manufactured from elastic neoprene. Armrests 24 are provided with coupling means embodied as an eye 26 for mounting a work surface (not shown here) on armrests 24. The upper side of the work surface extends here in the same plane as the upper surface of the armrests. Footrests and a headrest (not shown here) can further be connected to sitting orthosis 70. Using mounting points 11 the sitting orthosis 70 can be connected to a frame of for instance a wheelchair (not shown).

Figure 7:
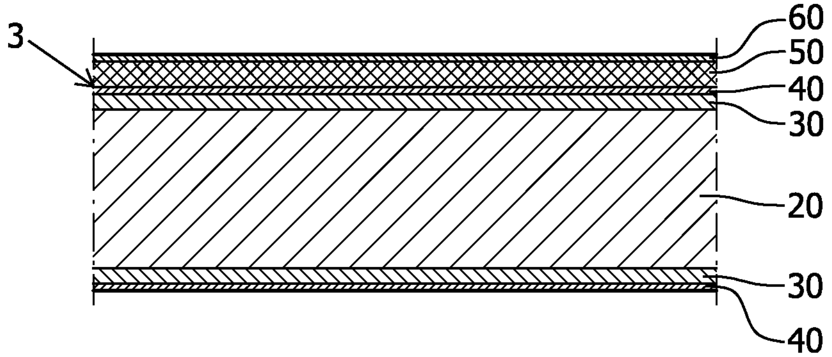
FIG. 7 shows a highly schematic section of the shell part of the sitting orthosis according to the invention.

FIG. 7 shows a highly schematic section of shell part 40 of sitting orthosis 70. The base of shell part 40 is formed by core 20. Core 20 is provided with a plastic coating 30. Core 20 with plastic coating 30 arranged thereon forms a sandwich construction which imparts strength and stiffness to shell part 40. This plastic coating 30 also makes shell part 40 wear-resistant. A colour coating 41 is applied to plastic coating 30. Soft foam layer 50 and upholstery layer 60 are placed on processing surface 3.

Figure 8A:
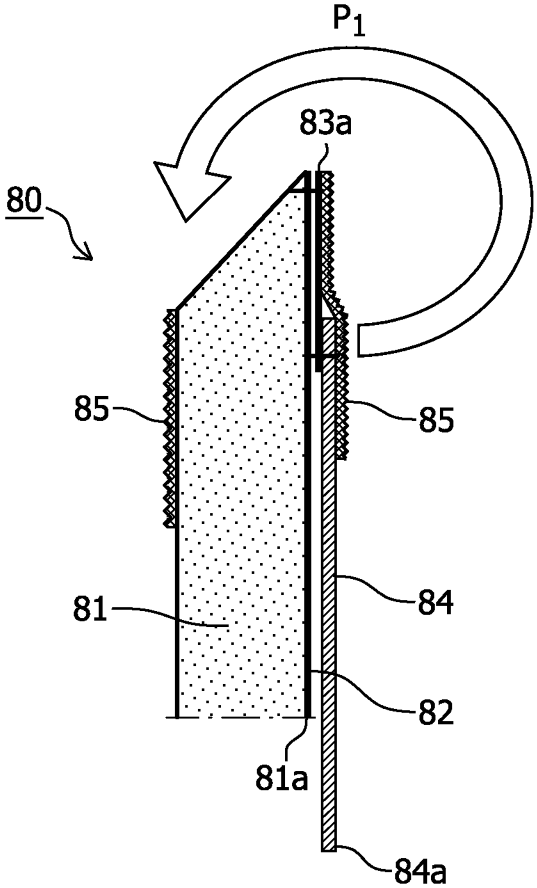
FIG. 8*a* shows a cross-section of a covering layer in a first phase of the manufacture thereof.

FIG. 8*a* shows a covering layer 80 according to the invention. Covering layer 80 comprises a cushion layer 81 manufactured from polyether. A top layer 82 is connected to a surface 81*a* of cushion layer 81 by means of an adhesive. An edge of a hook and loop strip 83*a*, the active side of which is directed toward top layer 82, is connected to a side 82*a* of top layer 82. A pull strip 84 is connected to a free edge portion of a hook and loop strip 83*a*. Adhesive layers 85 are applied over the side of hook and loop strip 83*a* remote from top layer 82, a part of pull strip 84 and on the side of cushion layer 81 remote from the top layer. By grasping pull strip 84 at an end 84*a* and rotating it as according to arrow P1 the hook and loop strip 83*a* is rotated, whereby the active side of hook and hook and loop strip 83*a* is carried to the side remote from top layer 82 (see FIG. 8*b*). Adhesive layers 85 are here temporarily pressed as according to arrow P2 in order to effect an adhesive connection between hook and loop strip 83*a* and cushion layer 81. Pull strip 84 can then be removed if desired. A covering layer 80 is in this way obtained which is provided with a hook and loop strip 83*a* on the peripheral edge.

Figure 8B:
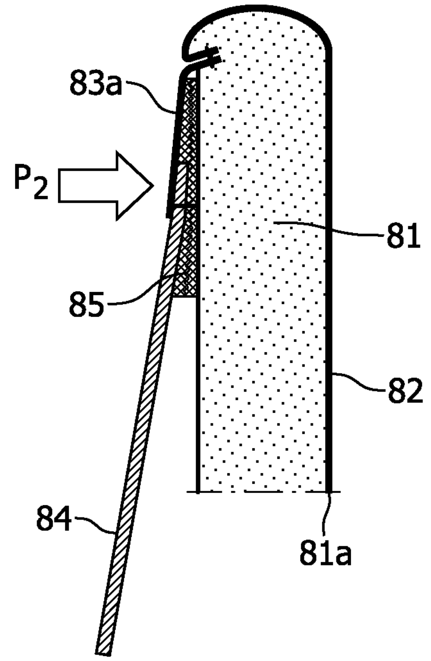
FIG. 8*b* shows a cross-section of the covering layer according to FIG. 8*a* at a second stage in the manufacture thereof.
Figure 9:
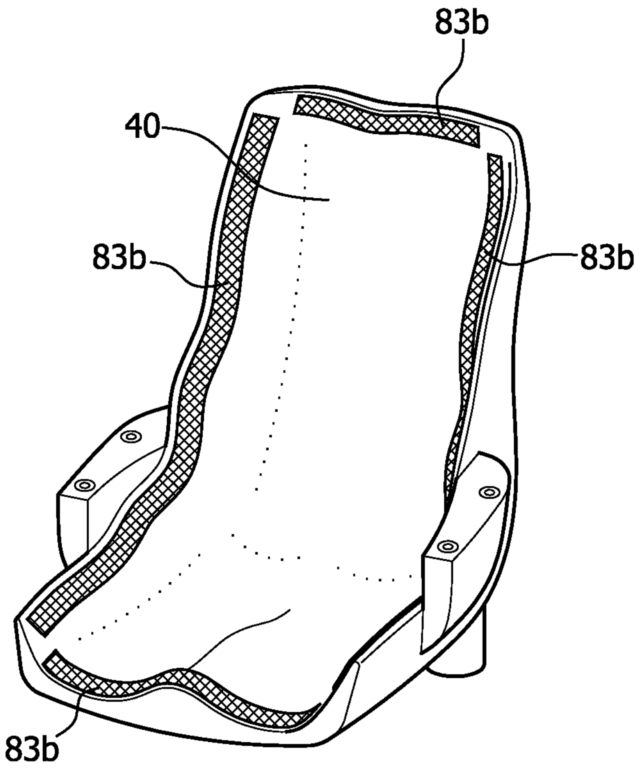
FIG. 9 shows a perspective view of a shell part according to FIG. 4*c* provided with velcro strips.

FIG. 9 shows shell part 40 according to FIG. 4*c*, onto which hook and loop strips 83*b* have been adhered along the peripheral edge of shell part 40 for co-action with hook and loop strips 83*a* of covering layer 80 of FIGS. 8*a*,8*b*. Covering layer 80 provided with hook and loop strips 83*a* is placed in shell part 40 such that hook and loop strips 83*a* are placed on the hook and loop strips 83*b* adhered to shell part 40. The co-action between hook and loop strips 83*a* and 83*b* provides for a connection between covering layer 80 and shell part 40 (see also FIG. 10).

Figure 10:
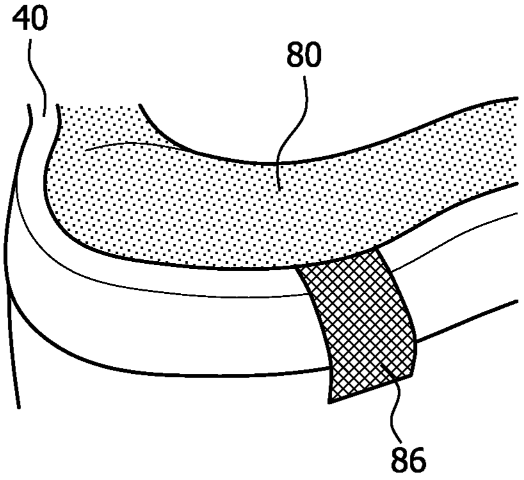
FIG. 10 shows a detail view of the shell part of FIG. 9 provided with the covering layer of FIG. 8*b*.

FIG. 10 shows a detail view of shell part 40 of FIG. 9 provided with the covering layer of FIGS. 8*a*,8*b*. Hook and loop strips 83*a* and 83*b* are here covered by covering layer 80. In this embodiment covering layer 80 is provided with a number of straps 86 fastened to the peripheral edge of covering layer 80 and each provided with a first press-stud (not shown) for co-action with second press-studs (not shown) arranged at corresponding positions on shell part 40. A strong fastening of covering layer 80 to shell part 40 is hereby obtained.

It will be apparent that numerous modifications can be made to the exemplary embodiments shown here within the scope of the invention as defined in the appended claims.

The invention claimed is:

1. A method for manufacturing a sitting orthosis, which is provided with a contact surface where the user of the sitting orthosis makes contact with the sitting orthosis, from a representation of the contact surface, comprising the steps of:

providing a digital file, wherein the contact surface of the sitting orthosis is represented by the digital file;

extending, in the digital file, surfaces adjacent to the contact surface and providing indicators for inserts to create a modified file;

modifying representation, in the modified file, of at least the contact surface for a thickness of a layer of stiff material;

after modifying for the thickness of the layer of stiff material, manufacturing a shell part on the basis of the representation of the contact surface by machining processable material under the control of the representation of the contact surface of the sitting orthosis using the digital file and the modified file;

recessing spaces for the inserts during manufacture of the shell part;

mounting inserts on the shell part before the layer of stiff material is arranged;

covering the shell part with the layer of stiff material after the machining process; and arranging a covering layer on the thus obtained shell part;

wherein the digital file is used to control the machining process.

2. The method as claimed in claim 1, wherein the representation of the contact surface is recessed locally to create a modified representation, and that use is made of the modified representation of the contact surface in the machining manufacture of the shell part.

3. The method as claimed in claim 1, wherein the shell part is manufactured from expanded polystyrene.

4. The method as claimed in claim 1, wherein before the shell part is manufactured the representation of at least the contact surface is modified for the thickness of the covering layer.

5. The method as claimed in claim 1, wherein the covering layer is assembled from cut-out flat parts of flexible material, the form of which is determined in digital manner from a digital representation of at least the contact surface.

6. The method as claimed in claim 5, wherein the covering layer is assembled from a cushion layer and a top layer, and that the two layers are assembled from cut-out flat parts of flexible material, the form of which is determined in digital manner from the digital representation of the contact surface.

7. The method as claimed in claim 6, wherein the cushion layer and top layer are connected to each other prior to cutting out of the flat parts.

8. The method as claimed in claim 6, wherein the top layer is arranged on surfaces of the shell part adjacent to the contact surface.

9. The method as claimed in claim 8, wherein a part of the cushion layer and/or the top layer extending beyond the outer contour of the contact surface is connected to the shell part via releasable fastening means.

10. The method as claimed in claim 6, wherein prior to being arranged on a hard layer, the cut-out parts of the top layer are mutually connected by stitching of the cut sides, and that positions of the contact surface which are uncomfortable for the user are formed by pieces of material.

11. The method as claimed in claim 5, wherein prior to being arranged on the shell part the cut-out flat parts of the covering layer are mutually connected by adhering the cut sides.

12. The method as claimed in claim 11, wherein the covering layer is arranged removably on the shell part.

* * * * *

UNITED STATES PATENT AND TRADEMARK OFFICE

CERTIFICATE OF CORRECTION

PATENT NO. : 8,881,356 B2
APPLICATION NO. : 13/375001
DATED : November 11, 2014
INVENTOR(S) : Kamiel Reinier Zale Geenen et al.

It is certified that error appears in the above-identified patent and that said Letters Patent is hereby corrected as shown below:

In the Claims

Column 8, Line 65, Claim 1, after “surface” insert -- of the sitting orthosis --

Signed and Sealed this
Tenth Day of March, 2015

Michelle K. Lee
*Deputy Director of the United States Patent and Trademark Office*